United States Patent
Fischer et al.

(10) Patent No.: US 6,761,047 B2
(45) Date of Patent: Jul. 13, 2004

(54) APPARATUS FOR MELTING OFF A GLASS PART FROM A HOLLOW GLASS OBJECT

(75) Inventors: Wolfgang Fischer, Mainz (DE); Alois Christ, Wiesbaden (DE); Heiner Muehl, Mainz (DE)

(73) Assignee: Schott Glas, Mainz (DE)

( * ) Notice: Subject to any disclaimer, the term of this patent is extended or adjusted under 35 U.S.C. 154(b) by 414 days.

(21) Appl. No.: 09/602,131

(22) Filed: Jun. 23, 2000

(65) Prior Publication Data

US 2002/0046578 A1 Apr. 25, 2002

(30) Foreign Application Priority Data

Jun. 26, 1999 (DE) .......................................... 199 29 413

(51) Int. Cl.[7] .......................... C03B 23/00; C03B 29/00
(52) U.S. Cl. ............................. 65/269; 65/113; 65/166; 65/270; 65/271; 65/272
(58) Field of Search ........................... 65/113, 166, 270, 65/271, 272, 269

(56) References Cited

U.S. PATENT DOCUMENTS

| | | | |
|---|---|---|---|
| 2,573,266 A | * | 10/1951 | Melcher et al. |
| 2,725,678 A | * | 12/1955 | Weingarten .................. 65/271 |
| 4,675,043 A | * | 6/1987 | Conta et al. ................... 65/271 |
| 4,687,503 A | * | 8/1987 | Valdes-Neri et al. .......... 65/271 |
| 4,731,040 A | * | 3/1988 | Tominaga et al. ............. 65/271 |

FOREIGN PATENT DOCUMENTS

| | | | |
|---|---|---|---|
| DE | 31 21 138 C2 | 3/1984 | |
| FR | 818525 | * 9/1937 | ................... 65/271 |

OTHER PUBLICATIONS

Patent Abstracts of Japan 01270526 A, Oct. 27, 1989.

* cited by examiner

*Primary Examiner*—Michael Colaianni
(74) *Attorney, Agent, or Firm*—Michael J. Striker

(57) ABSTRACT

The apparatus for melting off a glass top part from a hollow glass blank has individual burner sections (3) each containing at least one burner nozzle. The individual burner sections (3) are held in a cutting plane and movably connected with each other. A control device (4a, 4b, 5) controls the respective positions of the burner sections (3) so that they fit any arbitrary outer contour of the hollow glass blank (1). The control device (4a, 4b, 5) holds and maintains the burner sections (3) at a constant distance from the exterior surface of the hollow glass blank (1). The burner device with the burner sections (3) is mounted on two half frames pivotally connected with each other for better access to the glass object (1). This apparatus separates the glass top part from oval or triangular glass objects, which should be cut at an inclined orientation, in a single step.

8 Claims, 3 Drawing Sheets

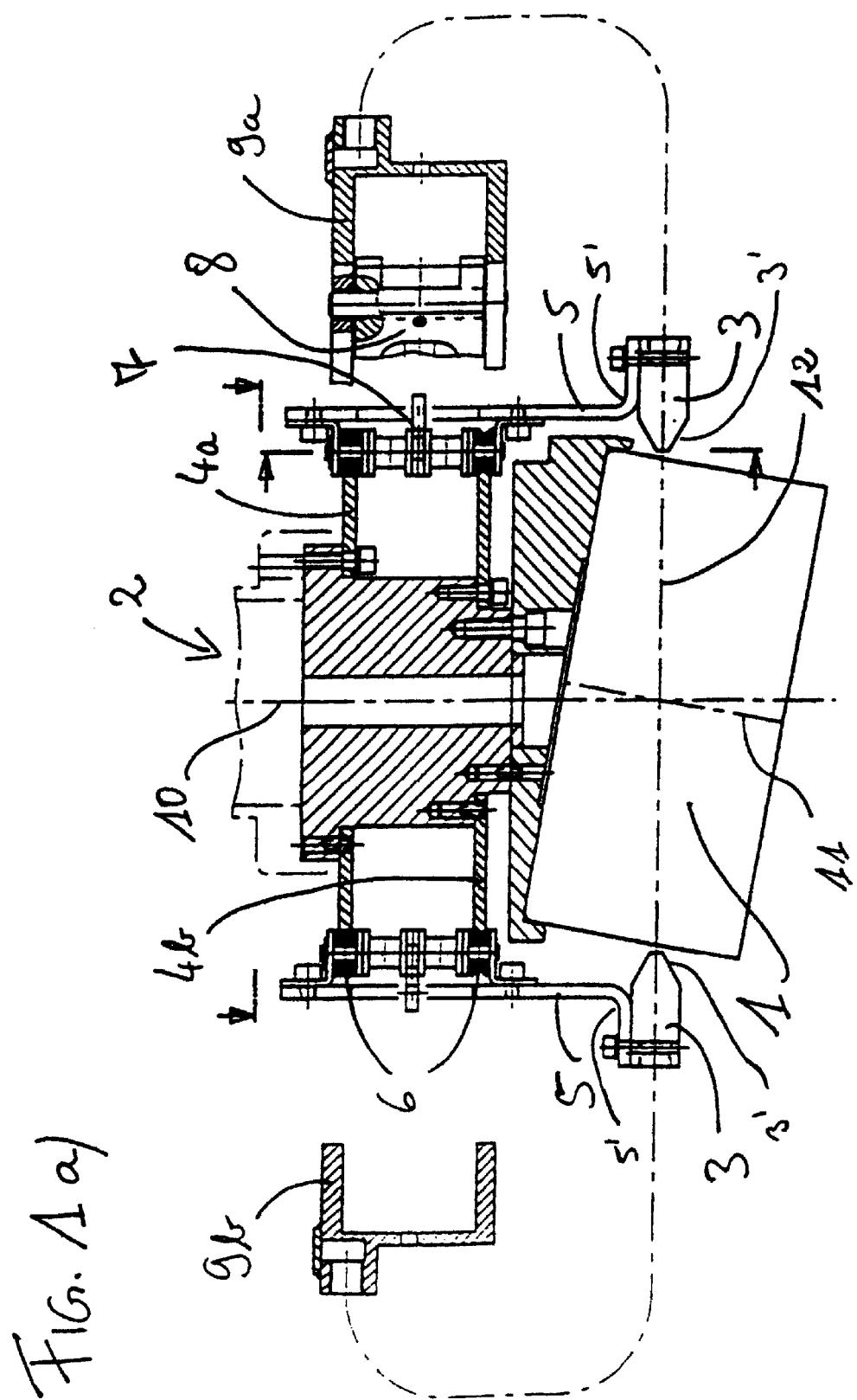

APPARATUS FOR MELTING OFF A GLASS PART FROM A HOLLOW GLASS OBJECT

BACKGROUND OF THE INVENTION

1. Field of the Invention

The present invention relates to an apparatus for melting off a glass part from a hollow glass object, especially to form a non-circular cut surface, which includes a burner device arranged around the hollow glass object, a holding and rotating device, in which the hollow glass object to be melted off is held fixed and by which it is rotated, and a control device for controlling the melting off of the glass part from the glass object by means of the burner device.

2. Prior Art

Hollow glass bodies are made by blowing glass, either by machine or by hand. A glass blank is produced, which has a glass top part with a glass ring besides the form of the desired article. This top part of the glass blank resulting from the manufacture must be cut away in a subsequent process from the actual desired glass product.

A method usually used for this separation process in the hollow glass industry is hot melting off by means of a gas/oxygen burner. A work tool holds the glass blank and rotates it about its own axis, while a stationary annular burner, e.g. a burner whose nozzles are arranged in a circle, with a predetermined spacing from the glass surface heats the glass, until the glass top part with the glass ring drops off. The rotation of the hollow glass blank is necessary in order to compensate for nonuniformities in the heat distribution due to, for example, a clogged nozzle. The hollow glass object is normally clamped in such a way that the glass top part points downward and can drop downward with the help of drawing tongs which grip the glass top part.

A sufficient quality for the separation process is only achieved when the spacing between the hollow glass object and the burner nozzles is maintained constant around the entire circumference. Otherwise the glass top part releases only in a non-uniform manner from the glass object or blank and the cut edge of the glass product thus formed is deformed and irregular.

This is no problem for hollow glass objects whose cut surface is circular. However it is not possible to separate the glass top part from a hollow glass object to form a non-circular cut surface with the standard hot melt off. Hollow glass objects that have a non-rotationally symmetric shape, especially oval or triangular, have a non-circular cut surface. A non-circular cut surface is also produced from a rotationally symmetric hollow glass object with a circular cross-section, which is not held in the holding device so that it is perpendicular to the central axis of the circular burner device. Instead it is held inclined to the central axis in the holding device. Then the cut surface is elliptical.

Currently in the case of a hollow glass blank from which a glass top part is melted off to form a non-circular cut surface, the glass top part is cut off with the help of a diamond grinding disk and subsequently the cut edge of the hollow glass blank is fused or ground smooth. This type of separation is disproportionately expensive and can make the final product very expensive.

JP H01-270526A suggests using a burner device whose burner nozzles are arranged so that they correspond to the shape of the cut surface. This generally has the disadvantage for non-circular cut surfaces that, on the one hand, a special burner is needed for each cut surface shape and size and that, on the other hand, uniform melting cannot be guaranteed, since the hollow glass object and burner device cannot be rotated relative to each other.

SUMMARY OF THE INVENTION

It is an object of the present invention to provide an apparatus with which a glass part can be hot-melted off from an arbitrarily shaped hollow glass body, object or blank to form a non-circular cut surface, without after-working the cut edges.

This object, and others which will be made more apparent hereinafter, are attained in an apparatus for melting off a glass part from a hollow glass object, especially to form a non-circular cut surface, which has a burner device arranged around the hollow glass object, a holding and rotating device, in which the hollow glass object to be melted off is held fixed and by which it is rotated, and a control device for controlling the melting off of the glass part from the hollow glass object by means of the burner device.

According to the invention, the burner device includes burner sections attached movably in a cutting plane around the glass object so that all burner sections can be always arranged at a constant distance from the exterior surface of the hollow glass object with the aid of the control device.

The present invention is based on a division of the conventional annular burner device into a plurality of individual burner sections and mounting the burner sections, so that they are movable or adjustable. A burner section includes at least one burner nozzle. The positions of the burner sections in the cutting plane are adjustable. They can be controlled individually by the control device. They are controlled so that all of them always maintain a constant spacing from the exterior surface of the hollow glass object during the entire melting process. For that purpose information must be stored in the control device regarding the location of each individual point on the outline of the cut surface as a function of the rotation angle in the cutting plane.

The apparatus according to the invention can be adjusted for each arbitrary cut surface, since only information regarding the location of the points on the outline of the cut surface changes. If necessary, the number and dimensions of the individual burner sections can be adjusted. This is however only necessary with strongly varying cut surfaces. The apparatus according to the invention thus allows arbitrarily shaped hollow glass bodies to be cut into two parts at any arbitrary plane by hot melting off by means of a burner. This cutting off happens now in only one step and not in two steps, as in cutting separations with a diamond grinding disk and subsequently with thermal fusion treatments. Because the burner sections are always held at the same constant distance from the hollow glass object, the glass melts uniformly and the cut edge does not need to be further worked after separation of the parts from each other.

In a preferred embodiment the control device has at least one template and a mechanical coupling device arranged between the at least one template and the burner sections. The template contains the information regarding the position of the points on the outline of the cut surface of the hollow glass blank in the cutting plane. The mechanical coupling device scans the template and divulges the location information controlling to, i.e. appropriately adjusts and guides, the burner sections, since the mechanical coupling device can change the distance of each burner section to the hollow glass surface.

Other control devices could, for example, be processor-assisted or have a template, which is scanned optically, whereby the optical signal controls the burner sections.

Preferably at least one template with the same rotation axis as the hollow glass object is attached in the holding and rotating device and is rotated like the hollow glass blank with the same angular speed. It is still advantageous when the outline of each template is equal to the outline of the cut surface of the hollow glass blank. In that case the embodiment of the mechanical coupling device is kept as simple as possible, since the mechanical coupling device can communicate the position information in the template 1:1 to the burner sections. For example, no longitudinal transformation by means of special conversions is needed.

In a preferred embodiment the individual burner sections are movable together with each other. The individual burner sections are connected with each other by means of a pivot joint, so that they are movable in the cutting plane relative to each other. Thus the pivot joints do not necessarily need to be added to the burner sections, but can be found on the mechanical coupling device for the burner sections with the template.

The mechanical coupling device between the template and the individual burner sections preferably comprises a respective rod attached to each burner section, which has at least one roller for traveling on the template circumference a on its end opposite the burner section. If the burner section is spaced a short distance from the hollow glass object and the template rotates a bit further, so that the burner section now has an additional spacing from the burner section, the template presses the rod further from the rotation axis of the template by means of the roller. Since the rod is rigidly connected with the burner section, it transmits this spacing change to the burner section. In this embodiment it is appropriate when the template is directly attached over the hollow glass object and has the same rotation axis.

Preferably plural burner sections are assembled in subsections, which are engaged with template. Because of this feature it is guaranteed that the burner sections have a constant spacing from the hollow glass surface.

In order to stabilize the system of. mechanical coupling, an additional embodiment of the invention has two templates with equal circumferences arranged one above the other. In the case of mechanical coupling by means of a rod, two rollers are attached to this rod. While the two rollers travel around the templates, possible jumping or release of one of the templates from its roller guiding it is prevented.

It has proven to be especially advantageous to form the apparatus from two parts which complement each other, for example two half frames, which are pivotable away from each other and on which the burner device with its burner components is mounted. Because of this feature it is possible to pivot away half of the burner sections, so that one has better access to the hollow glass object or body and it can be clamped more easily in the holding and rotating device.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
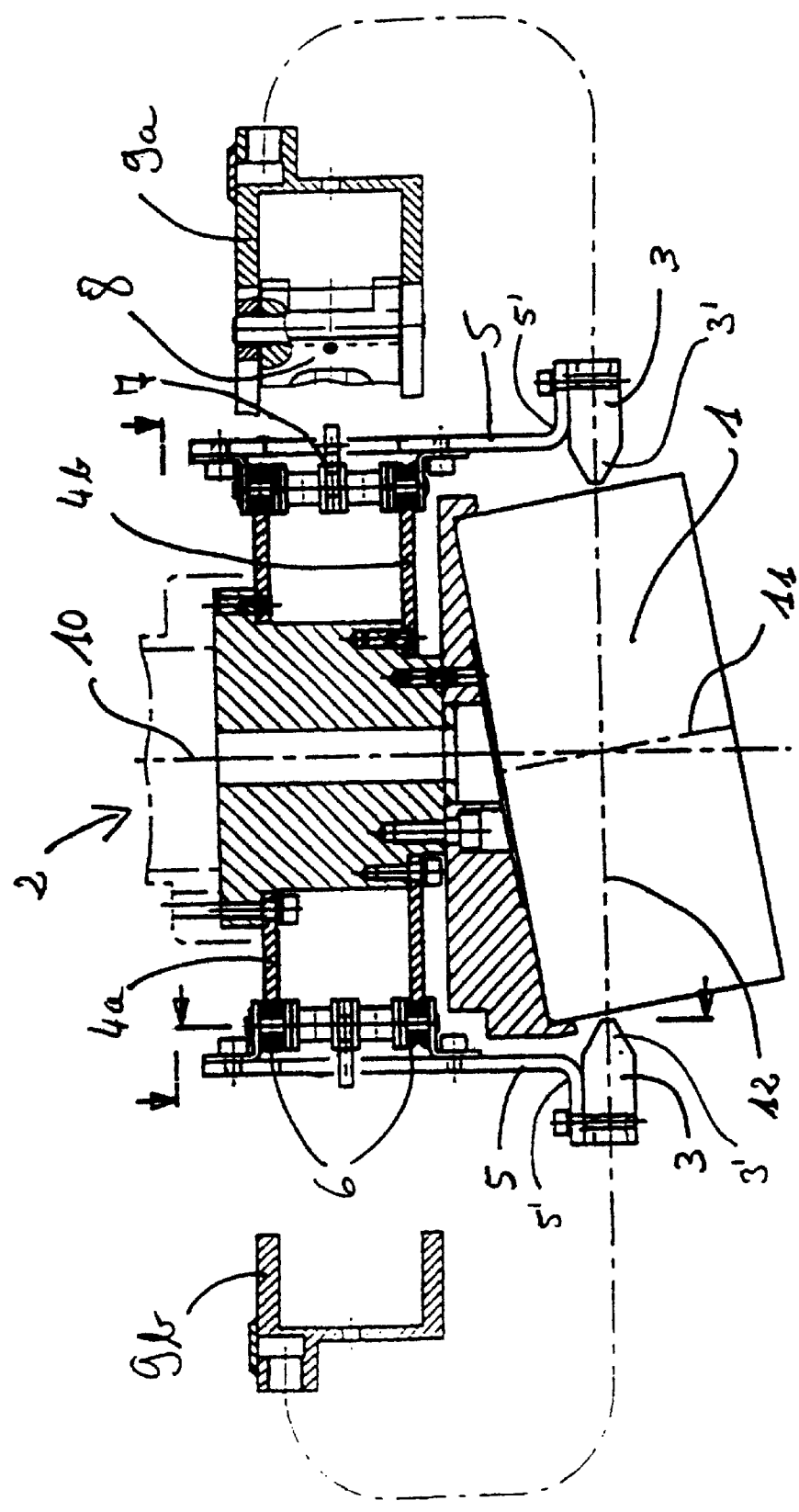
FIGS. 1*a* and 1*b* are respective cross-sectional view through the apparatus according to the invention taken along section line I—I in FIG. 2.

FIG. 1*a* shows a hollow glass blank 1, which is held in an inclined orientation in the holding and rotation device 2, i.e. it is held fixed so that its rotation axis 10 and the central axis 11 of the hollow glass blank 1 do not coincide with each other. The hollow glass blank 1 is a glass object with a circular cross-section. Since it is clamped in an inclined or slanted orientation, an elliptical cut surface is provided by the cutting action of the burner sections 3. FIGS. 1*a* and 1*b* are identical, except for the fact that the hollow glass blank 1 in FIG. 1*b* is rotated about 1800 relative to the hollow glass blank in FIG. 1*a*.

The upper template 4*a* and the low template 4*b* are attached to the holding and rotating device 2. Both templates 4*a* and 4*b* have the same circumference, which is identical to the circumference of the cut surface. The templates 4*a* and 4*b* are arranged parallel to each other and fixed in the holding and rotating device above the hollow glass blank 1. A point on the outline of one of the templates 4*a* and 4*b* is located at the same distance to the rotation axis 10 and moves with the same angular speed as the corresponding point on the outline of the cut surface of the hollow glass blank 1. The outer peripheries of the templates 4*a* and 4*b* are traversed by the rollers 6, which are attached to a rod 5 as a pair. A pivot joint 7 is connected between both rollers 6 of the rod 5, by which the rod 5 is pivotally connected with its neighboring rod 5. The rod 5 is parallel to the rotation axis 10 and has a bent portion 5' in a lower region, i.e. the region facing away from the rollers. A burner section 3 is attached under the bent portion 5' of each rod 5. The burner section 3 is oriented so that the nozzle 3' of the burner section 3 is arranged in the cutting plane 12 and perpendicular to the rotation axis 10.

The burner section 3 is located at a minimum spacing from the rotation axis 10. If the hollow glass blank 1 is rotated further, also the templates 4*a* and 4*b* rotate an equal extent further. The point, on which the roller, which belongs to the rod 5 and the burner element 3, is located on the outline of the templates 4*a* and 4*b*, now has a greater distance to the rotation axis 10. The rollers 6 are pressed away from the templates 4*a* and 4*b*. This motion is transmitted to the burner section 3 by means of the rod 5, so that the nozzle 3' of the burner section 3 is now displaced further from the rotation axis 10 and thus has the same spacing to the wall or exterior surface of the hollow glass blank 1 as it had prior to the further rotation.

Since the burner sections 3 are connected movably with each other by means of the pivot joint 7 on the rods 5, the motion of a burner section 3 has an effect on the position of the adjacent burner section 3. If a burner section 3 is displaced from the rotation axis 10 by the rod 5, this burner section 3 causes a rotational motion of its neighboring burner section 3, by which the neighboring burner section approaches close to the rotation axis. They are connected so that the distance between the individual burner sections is constant.

Figure 2:
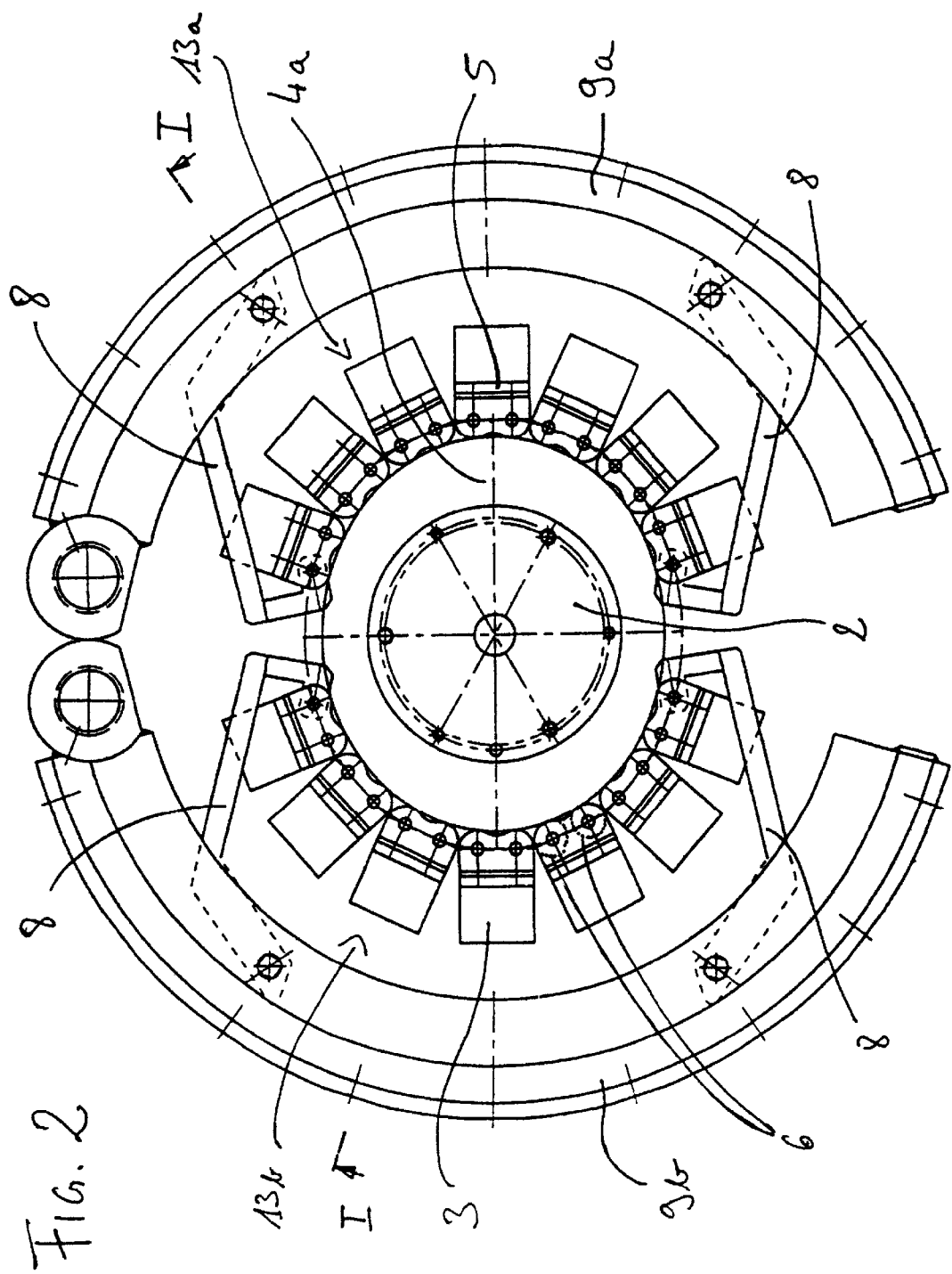
FIG. 2 is a plan view of the apparatus for melting off a glass top from a hollow glass blank, especially to form a non-circular cut surface, according to the invention.

FIG. 2 shows the apparatus from above. FIGS. 1*a* and 1*b* are cross-sectional views taken along the section line I—I shown together with the arrows in FIG. 2. Only the uppermost template 4*a* is seen in the plane view of FIG. 2. The lower template 4*b* and the hollow glass blank 1 are covered or masked in the view shown in FIG. 2. The elliptical form of the upper template 4*a* and corresponding the lower template 4*b* as well as the cut surface are clearly illustrated. The group of the burner sections 3 conforms equally to this elliptical form and allows a uniform melting off of the glass part from hollow glass blank 1 in spite of the non-circular cut surface. The position of the masked rollers 6 is indicated in an exemplary manner on one burner section 3.

The burner sections 3 are divided or grouped into two groups 13*a*, 13*b*. The burner sections 3 of each group are pivotally connected with each other but separately from the burner sections of the other group. The respective groups of the burner sections are pivotally and separately connected with the half frames 9*a* and 9*b* via holding rods 8. Because the holding rods 8 are pivotally attached, the burner sections 3 can be still better fit to the periphery of the cut surface. Since the holding rods 8 are pre-stressed pair-wise working in opposite directions, the groups 13*a*, 13*b* are clamped or fixed and press against the templates 4*a*, 4*b*.

The division of the burner sections into two groups 13*a*, 13*b* and the frame into two half frames 9*a* and 9*b* has the advantage that the frame can be opened or closed. Because of that the two groups of the burner sections 3 can be pivoted away from each other and from the hollow glass blank 1 to gain access to the hollow glass blank. Thus the hollow glass blank 1 may be more easily fixed in the holding and rotating device 2 or removed from it.

While the invention has been illustrated and described as embodied in an apparatus for melting off a part of a hollow glass object, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An apparatus for melting off a glass part from a hollow glass body to form non-circular as well as circular cut surfaces, said apparatus comprising
    a burner device (3,3';13*a*, 13*b*) including a first group (13*a*) of individual burner sections (3) connected pivotably with each other and a second group (13*b*) of individual burner sections (3) connected pivotably with each other but separately from said burner sections of said first group, said burner sections (3) being provided with respective nozzles (3') arranged in a common cutting plane (12) so that the hollow glass object (1) with the glass part to be melted off is positionable with the burner sections arranged around the hollow glass object (1) with the nozzles pointing at the hollow glass object in a direction in the common cutting plane (12);
    holding and rotating means (2) for holding and for rotating the hollow glass object (1) in relation to the burner sections (3) positionable around said hollow glass object (1);
    control means (4*a*, 4*b*, 5, 5', 6) for arranging and maintaining said nozzles (3') of said burner sections (3) at a constant distance in the cutting plane (12) from an exterior surface of the hollow glass object (1) while said hollow glass object (1) is rotated by said holding and rotating means (2); and
    two half frames (9*a*,9*b*) pivotable toward and away from each other, said first group (13*a*) of said burner sections (3) being mounted on one (9*a*) of said half frames and said second group (13*b*) of said burner sections (3) being mounted on another (9*b*) of said half frames, whereby said first group of said burner sections and said second group of said burner sections are pivotable away from each other so that the hollow glass object (1) is easily mounted on or removed from said holding and rotating means (2).

2. The apparatus as defined in claim 1, wherein the control means (4*a*, 4*b*, 5, 5', 6) comprises at least one template (4*a*, 4*b*), said at least one template having an outline that corresponds to a cut edge surface of said hollow glass object (1), and a mechanical coupling device (5, 5', 6) for coupling the at least one template (4*a*, 4*b*) and the first group and second group of the burner sections (3) so that said burner sections are movable with said nozzles around said at least one template following said outline.

3. The apparatus as defined in claim 2, wherein said holding and rotating means (2) has a rotation axis (10), said at least one template (4*a*, 4*b*) is non-rotatably attached to said holding and rotating means (2) and said hollow glass object (1) is rotatable about said rotation axis (10) together with said at least one template (4*a*,4*b*) by means of said holding and rotating means (2).

4. The apparatus as defined in claim 1, wherein said burner sections (3) are connected movably with each other in the cutting plane by means of a pivot joint (7).

5. The apparatus as defined in claim 2, wherein each of said burner sections (3) is connected with a respective rod (5) and said respective rod (5) has a corresponding roller (6) arranged on an end of said respective rod (5) opposite from the burner section (3), said corresponding roller (6) comprising means for traveling over and following an outline of said at least one template (4*a*, 4*b*).

6. The apparatus as defined in claim 1, wherein the control means (4*a*, 4*b*, 5, 5', 6) comprises two templates (4*a*, 4*b*), said two templates having respective outlines that each correspond to a cut edge surface of said hollow glass object (1), and mechanical coupling means (5, 5', 6) for coupling the two templates (4*a*, 4*b*) and the first group (13*a*) and the second group (13*b*) of the burner sections (3) so that said burner sections are movable with said nozzles around said templates following said outlines.

7. The apparatus as defined in claim 6, wherein the two templates (4*a*, 4*b*) have equal circumferences.

8. An apparatus for melting off a glass part from a hollow glass object of any arbitrary shape, said apparatus comprising
    holding and rotating means (2) for holding and for rotating the hollow glass object (1);
    a burner device (3,3';13*a*, 13*b*) including a first group (13*a*) of individual burner sections (3), said individual burner sections being connected pivotably with each other at respective pivot joints (7), and a second group (13*b*) of individual burner sections (3) connected pivotably with each other by respective other pivot joints (7) but separately from said burner sections of said first group, said burner sections (3) each being provided with a respective nozzle (3') arranged in a common cutting plane (12) passing through said hollow glass object (1), when said hollow glass object is held and rotated by said holding and rotating means (2), so that each of said nozzles (3') points toward the hollow glass object (1) and in a direction in the common cutting plane (12);
    control means (4*a*, 4*b*, 5, 5', 6) for arranging and maintaining each of said nozzles (3') of said burner sections (3) at a constant distance in the cutting plane (12) from an exterior surface of the hollow glass object (1) when said hollow glass object is held and rotated by said holding and rotating means (2); and
    two half frames (9*a*,9*b*) pivotable toward and away from each other, wherein said first group (13*a*) of said burner sections (3) is mounted on one of said half frames (9*a*) and said second group (13*b*) of said burner sections (3)

is mounted on another (9*b*) of said half frames, so that said first group of said burner sections and said second group of said burner sections are pivoted away from each other when said half frames are pivoted so that the hollow glass object (1) is easily mounted on or removed from said holding and rotating means (2);

wherein said control means (4*a*, 4*b*, 5, 5', 6) consists of at least one template (4*a*, 4*b*) rigidly mounted on said holding and rotating means (2), said at least one template having an outline that is identical with an outline of an edge surface to be formed when said glass part is cut from said hollow glass body (1), and a mechanical coupling device (5, 5', 6, 7) for coupling the at least one template (4*a*, 4*b*) with each of the burner sections (3,3') so that each of said nozzles (3') of said burner sections (3) is maintained at a constant distance from said exterior surface of the hollow glass object when said hollow glass object is rotated by said holding and rotating means (2) and when said two half frames (9*a*,9*b*) are not pivoted away from each other; and wherein said mechanical coupling device (5, 5', 6) comprises at least one rod (5) attached nonrotatably to each of said burner sections (3,3') and at least one roller (6) mounted on said at least one rod (5,5') so as to bear on and rotate on an outer edge of said at least one template (4*a*,4*b*).

* * * * *